United States Patent
Bauernfeind et al.

(10) Patent No.: US 12,307,005 B2
(45) Date of Patent: May 20, 2025

(54) METHOD AND DEVICE FOR DETERMINING A POSE IN SMART GLASSES

(71) Applicant: Bayerische Motoren Werke Aktiengesellschaft, Munich (DE)

(72) Inventors: Tobias Bauernfeind, Munich (DE); Wolfgang Haberl, Munich (DE); Alan Keim, Munich (DE); Manfred Pauli, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/275,830

(22) PCT Filed: Mar. 29, 2022

(86) PCT No.: PCT/EP2022/058332
§ 371 (c)(1),
(2) Date: Aug. 4, 2023

(87) PCT Pub. No.: WO2022/218698
PCT Pub. Date: Oct. 20, 2022

(65) Prior Publication Data
US 2024/0302894 A1    Sep. 12, 2024

(30) Foreign Application Priority Data

Apr. 12, 2021 (DE) .................. 10 2021 109 082.2

(51) Int. Cl.
*G06F 3/01* (2006.01)
*G06T 7/11* (2017.01)
(Continued)

(52) U.S. Cl.
CPC ............... *G06F 3/012* (2013.01); *G06T 7/11* (2017.01); *G06T 7/73* (2017.01); *G06V 20/59* (2022.01);
(Continued)

(58) Field of Classification Search
CPC ... G06F 3/012; G06T 7/11; G06T 7/73; G06T 2207/30204; G06T 2207/30268; G06V 20/59
See application file for complete search history.

(56) References Cited

U.S. PATENT DOCUMENTS

| | | | |
|---|---|---|---|
| 2016/0224110 A1* | 8/2016 | Massonneau | G06F 3/013 |
| 2019/0102923 A1* | 4/2019 | Voisin | H04N 13/344 |
| 2019/0222774 A1 | 7/2019 | Kobayashi et al. | |

FOREIGN PATENT DOCUMENTS

| | | |
|---|---|---|
| DE | 10 2013 210 746 A1 | 12/2014 |
| DE | 10 2017 219 790 A1 | 5/2019 |

(Continued)

OTHER PUBLICATIONS

International Search Report (PCT/ISA/210) issued in PCT Application No. PCT/EP2022/058332 dated Jul. 25, 2022 with English translation (4 pages).
(Continued)

*Primary Examiner* — Towfiq Elahi
(74) *Attorney, Agent, or Firm* — Crowell & Moring LLP

(57) ABSTRACT

A method for operating smart glasses for the augmented presentation of information objects on a display surface on the basis of a smart glasses pose in a vehicle interior is provided. The smart glasses pose is ascertained by inside-out tracking on at least one marker provided fixedly in a vehicle interior or at least one object provided in the vehicle interior. The at least one marker or the at least one object can be located by a computer-assisted pattern recognition method
(Continued)

which is applied to a camera image of a smart glasses camera so that the smart glasses pose relative to the vehicle interior can be determined on the basis of a position, size and/or orientation of the at least one marker or of the at least one object. Only the camera image outside of a masking region is taken into account for the pattern recognition method.

10 Claims, 3 Drawing Sheets

(51) Int. Cl.
    *G06T 7/73*     (2017.01)
    *G06V 20/59*     (2022.01)
(52) U.S. Cl.
    CPC ............... *G06T 2207/30204* (2013.01); *G06T 2207/30268* (2013.01)

(56) References Cited

FOREIGN PATENT DOCUMENTS

DE     10 2019 201 134 A1     7/2020
EP     2 933 707 A1     10/2015

OTHER PUBLICATIONS

German-language Written Opinion (PCT/ISA/237) issued in PCT Application No. PCT/EP2022/058332 dated Jul. 25, 2022 (7 pages).
German-language Search Report issued in German Application No. 10 2021 109 082.2 dated Mar. 23, 2022 with partial English translation (14 pages).

* cited by examiner

METHOD AND DEVICE FOR DETERMINING A POSE IN SMART GLASSES

BACKGROUND AND SUMMARY OF THE INVENTION

The invention relates to smart glasses for an augmented reality display, in particular for use in a motor vehicle. Furthermore, the invention relates to measures for contact-analogous display of information objects on a display surface of the smart glasses.

Smart glasses, also called head-mounted displays, are known which can display an image on one or two display surfaces in the field of view of the wearer of the smart glasses with the aid of a display device. The display surfaces can correspond to reflection surfaces, which direct images into the eye of the wearer of the smart glasses. The vision openings of the smart glasses are transparent, so that the real surroundings can be perceived in a conventional manner through the smart glasses. The display surfaces are located in the vision openings, so that an item of information to be displayed, such as text, symbols, graphics, video displays, and the like, can be displayed overlaid on the perception of the surroundings.

The items of information can generally be displayed in a contact-analogous manner to the wearer of the smart glasses, i.e., displayed so that it is overlaid as an information object on a specific assigned surroundings position in the real surroundings or is oriented thereon or that the information object to be displayed is displayed in a specific alignment of the smart glasses or their wearer. Furthermore, the contact-analogous information object can be displayed so that it appears in the correct perspective with respect to the object or a surroundings position in the real surroundings, i.e., the illusion results that the surroundings object of the real surroundings or the surroundings position would actually be supplemented by the additional feature of the visual information object.

However, to display an information object correspondingly contact-analogously on the display surfaces of the smart glasses, it is necessary to know the surroundings position with respect to which the information object is to be displayed and to know the direction of view of the user. The direction of view of the user is generally fixedly assigned when the smart glasses are being worn to the smart glasses pose, i.e., the spatial position and the spatial orientation of the smart glasses. In particular for the display without flickering of contact-analogous information objects on the display surfaces of the smart glasses, particular requirements are necessary for the always reliable determination of a pose of the smart glasses.

The determination of the pose of the smart glasses is often provided with the aid of a glasses-internal pose detection unit for reasons of the lowest latency possible acquisition and rapid pose updating in the smart glasses. The pose detection unit generally includes an inertial sensor system and a computing device, for example in the form of a microprocessor. With the aid of the inertial sensor system, movements in the form of accelerations can be acquired and these can be converted by integration into a current pose of the smart glasses. Such pose detection units integrated in the smart glasses have an increasing pose detection error due to integration, which can be corrected with the aid of a pose detection unit provided externally to the smart glasses.

These external pose detection units can be camera-based, for example, and in particular use an interior camera, which is directed at the head of the wearer of the smart glasses. The interior camera acquires the head of the wearer of the smart glasses and can, by evaluating the camera image, either ascertain the pose of the head and the pose of the smart glasses can be derived therefrom or the glasses pose of the smart glasses can be ascertained directly. In these so-called outside-in tracking systems, one difficulty is that of transmitting the absolute pose specification ascertained outside the smart glasses, in particular with a wireless communication connection, with a sufficiently low latency to the smart glasses, so that the smart glasses can accordingly output contact-analogous displays without delay or with a delay which does not interfere.

In inside-out tracking, a smart glasses camera acquires a surroundings area lying in the direction of view of the driver or vehicle occupant, which comprises parts of the vehicle interior and also the vehicle surroundings through the transparent window. Inside-out tracking is among the presently most typical tracking methods for smart glasses and operate sufficiently well in stationary surroundings.

For tracking on edges or structures having a predetermined fixed position in the vehicle coordinate system, in particular in the event of a movement of the vehicle in its surroundings, a false detection can occur due to surroundings objects moving relative to the vehicle or relative to parts of the interior, which have similar contours to those of the structure for which the inside-out tracking of the smart glasses is designed. Therefore, in particular on moving platforms, the camera image of the smart glasses camera can only be evaluated with lower reliability, since the smart glasses camera has to evaluate different movement velocities with objects, in particular if the wearer of the smart glasses also performs a head movement in addition to a movement of the vehicle.

It is therefore the object of the present invention to provide a method for improving the inside-out tracking of the smart glasses for the determination of the pose thereof in a vehicle interior, which has an increased level of reliability.

This object is achieved by the method for determining a pose of smart glasses in a vehicle according to the claimed invention and by the smart glasses according to the claimed invention.

According to a first aspect, a method is provided for operating smart glasses for augmented display of information objects on a display surface in dependence on a smart glasses pose in a vehicle interior, wherein the smart glasses pose is produced by inside-out tracking on at least one provided marker or at least one provided object, wherein the at least one marker or the at least one object are locatable by a computer-assisted pattern recognition method, which is applied to a camera image of a smart glasses camera, so that the smart glasses pose is determinable relative to the vehicle interior in dependence on a position, size, and/or alignment of the at least one located marker or the at least one object, wherein the camera image is only taken into consideration outside a masking area for the pattern recognition method.

The masking area can be designed so that it excludes transparent panes/windows and/or movable objects in the vehicle interior.

The masking area can alternatively be designed so that it only comprises transparent panes/windows.

The above method relates to inside-out tracking in which a smart glasses camera records a camera image and this is evaluated with aid of simple image processing or edge recognition. Although algorithms for evaluating camera images can recognise simple structures of markers and objects in quasi-"real-time", the computing capacity required for this purpose is nonetheless substantial, which requires a significant installation space in the smart glasses and a high battery capacity. To reduce the processing power for evaluating the camera image, it is provided according to the above method that the camera image is only evaluated in specific image areas. For this purpose, the camera image is masked using a masking area and only image data of the camera image from the masking area are used for the evaluation.

In particular, the masking area can be derived from the interior geometry of the vehicle, which is provided by interior geometry data of a CAD model of the relevant vehicle. The tracking can only be carried out with respect to structures of markers and objects in selected areas, for example in the vehicle interior or in the vehicle surroundings, due to which the computing effort for the pattern recognition method sinks significantly, since the large-surface areas, such as the transparent areas (panes and windows) or the dashboard are left out in the calculation.

The masking area results from the interior geometry and an approximate pose of the smart glasses, which can be derived, for example, from a last ascertained pose of the smart glasses, an initial pose, and/or based on the evaluation of items of movement information from an inertial sensor system.

The masking area can thus comprise transparent areas and moving objects, such as the steering wheel, in the vehicle interior, so that the pattern recognition method only takes into consideration fixed areas in the vehicle interior. The inside-out tracking can thus ascertain the smart glasses pose in a vehicle coordinate system. Based on the approximate smart glasses pose and the interior geometry data of the interior, a masking area can be ascertained for the evaluation of the camera image of the smart glasses camera, which masks transparent panes of the vehicle and moving objects, such as the manual gear step switch or the steering wheel, so that only objects attached fixed in place in the vehicle interior can be used for the determination of the pose. This enables an accurate determination of the smart glasses pose at the point in time of the acquisition of the camera image with respect to a vehicle coordinate system.

Alternatively, the masking area can comprise all structures and objects in the vehicle interior, so that the pattern recognition method only takes into consideration areas outside the vehicle which can be perceived through vehicle openings and transparent areas, such as windows and panes. In particular, the inside-out tracking can thus ascertain the smart glasses pose in a surroundings coordinate system, i.e., with respect to the vehicle-external surroundings. The masking area can therefore also only select the areas of the external vehicle surroundings visible through the panes of the vehicle interior. A tracking of the smart glasses to markers or objects located in the surroundings area of the vehicle is thus possible, so that tracking of a smart glasses pose on a surroundings-fixed (world-fixed) coordinate system (surroundings coordinate system) is possible.

The above method enables a significant reduction of the computing power required for the evaluation of the camera image and can thus contribute to making a determination of pose in the smart glasses more efficient and reliable.

It can be provided that the interior geometry data are transmitted to the smart glasses upon or immediately after the start-up of the smart glasses in the vehicle from an assistance system of the vehicle, wherein the interior geometry data specify the interior geometry of the relevant vehicle.

The masking area can be applied to the camera image based on an initially predetermined smart glasses pose or a last ascertained smart glasses pose. For this purpose, the masking area is laid over the surroundings image detail of the camera image so that it corresponds to its orientation. For example, the part of the masking area which is supposed to mask a moving steering wheel can be applied over the camera image so that the steering wheel represented in the camera image is masked by the relevant part of the masking area.

According to a further aspect, smart glasses for the augmented display of information objects are provided, comprising a display surface, which is designed to display an information object in an augmented manner; a smart glasses camera, which is designed to acquire a camera image having at least one provided marker or at least one provided object; and a control unit, which is designed to mask the camera image using a masking area and to evaluate the masked camera image with the aid of a computer-assisted pattern recognition method in order to locate at least one marker or at least one object, to ascertain a smart glasses pose by inside-out tracking in dependence on a position, size, and/or alignment in dependence on the at least one located marker or the at least one located object in the masked camera image; wherein the camera image is only taken into consideration outside a masking area for the pattern recognition method; and to output the information object on the display unit in dependence on the smart glasses pose.

Embodiments are explained in more detail hereinafter on the basis of the appended drawings.

DETAILED DESCRIPTION OF THE DRAWINGS

Figure 1:
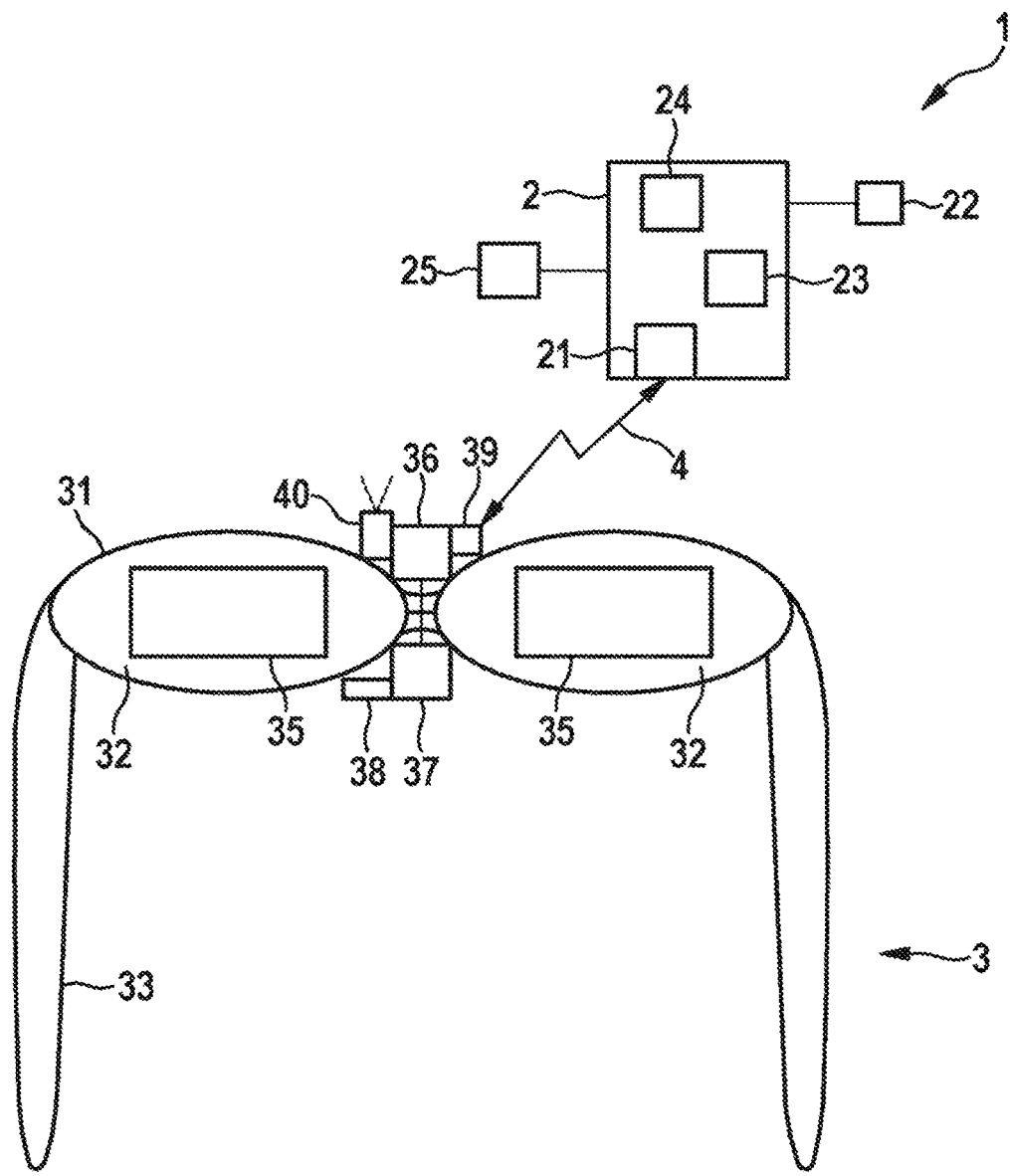
FIG. 1 shows a schematic representation of a display system having smart glasses for use in a motor vehicle.

FIG. 1 shows a schematic representation of a display system 1, in particular for use in a motor vehicle. The display system 1 comprises an assistance system 2, which has a communication connection 4 to smart glasses 3. The communication connection 4 is designed as a data transmission channel, for example, in the form of a wireless communication connection or a wired communication connection. The communication connection 4 is capable of transmitting any type of data and information between the assistance system 2 and the smart glasses 3, for example based on a per-packet data transmission. The communication connection 4 can be based, for example, on Wi-Fi, Bluetooth, Bluetooth low energy, or a comparable standardized radio protocol. Data about information objects to be displayed in a contact-analogous manner in the smart glasses can be transmitted via the communication connection, for example.

The assistance system 2 can be part of a vehicle assistance system and can in particular be provided fixed in place in the motor vehicle. The assistance system 2 can be equipped with a communication unit 21, which enables the communication connection 4 between smart glasses 3 and the assistance system 2.

The assistance system 2 can furthermore be connected to a surroundings acquisition system 22, which includes one or more cameras. The surroundings acquisition system 22 can acquire the surroundings of the motor vehicle. The one or more cameras can comprise, for example, an RGB, IR, or fisheye camera, a dynamic vision sensor, and the like.

The assistance system 2 can include a processor unit 23, by which at least one virtual information object for display in the smart glasses 3 can be generated and/or determined in a way known per se in dependence on a geographic position of the motor vehicle and in dependence on a surroundings image acquired by the surroundings acquisition system 22. The position of the at least one virtual information object can be specified with respect to a vehicle-fixed or world-fixed coordinate system (vehicle coordinate system or surroundings coordination). For the display in the smart glasses 3, an item of object information is generated which accordingly specifies the position of the at least one virtual information object, object content, and object type of the display in the smart glasses 3.

The smart glasses 3 comprise two transparent viewing panes 32, which are framed in a frame 31 in a way known per se. The frame 31 is provided with glasses earpieces 33, so that the smart glasses 3 can be worn on the head of a user in a way known per se.

One or both viewing panes 32 (glasses lenses) are furthermore provided with a transparent display surface 35, by which a display image for the display of virtual information objects can be projected into the eye of the wearer of the smart glasses 3 by a suitable device, such as a display device 36 arranged on the frame 31. The display device 36 can include a microprocessor or a comparable computing unit and a display unit, such as a projection device or the like. The display unit can be designed to direct the electronically generated display image onto the display surface 35 and to depict/display it there.

Due to the transparent design of the display surface 35, the electronically generated image can be overlaid on the real surroundings perceptible through the display surface 35. With the aid of the display device 36, a virtual information object, such as a text, a symbol, an item of video information, a graphic, or the like, can be displayed on one or both display surfaces 35.

The smart glasses 3 can be worn like a typical visual aid on the head of the user, wherein the smart glasses 3 rest with the frame 31 on the nose of the user and the earpieces 33 press laterally against the head of the user. The direction of view of the user in the straight-ahead direction then takes place through the transparent display surfaces 35 of the viewing panes 32, so that the direction of view of the user, which is specified by an eye position and an optical viewing axis (eye axis), has a fixed relation to the alignment of the smart glasses 3. This relation is individually dependent on the wearer of the smart glasses 3 and is specified by an item of calibration information.

To display information objects, corresponding items of object information in the form of object data can be transmitted from the assistance system 2 to the smart glasses 3 via the communication connection 4 or provided in another manner in the smart glasses 3. The object data specify in this case the type (shape, size, orientation) of the information object, such as a text object, an icon, a symbol, or another identifier having an object position or a display area, at which the information object is to be displayed on the display surface 35.

A smart glasses camera 40 can be provided for recognizing the smart glasses pose of the smart glasses 3, which is oriented in the direction of view of the wearer of the smart glasses 3 when the smart glasses 3 are worn and can acquire at least a part of the field of view of the wearer of the smart glasses 3.

Furthermore, a glasses inertial sensor 38 can be provided, which is designed, for example, in the form of a 6-DOF inertial sensor. This provides a movement specification in the form of one to three translational and/or one to three rotational accelerations.

With the aid of a control unit 37, items of object information are received via a communication device 39 from the assistance system 2 and processed, so that they are displayed in the respective viewing angle range in which the user of the smart glasses 3 looks. The viewing angle range is determined in dependence on the smart glasses pose of the smart glasses 3.

Figure 2:
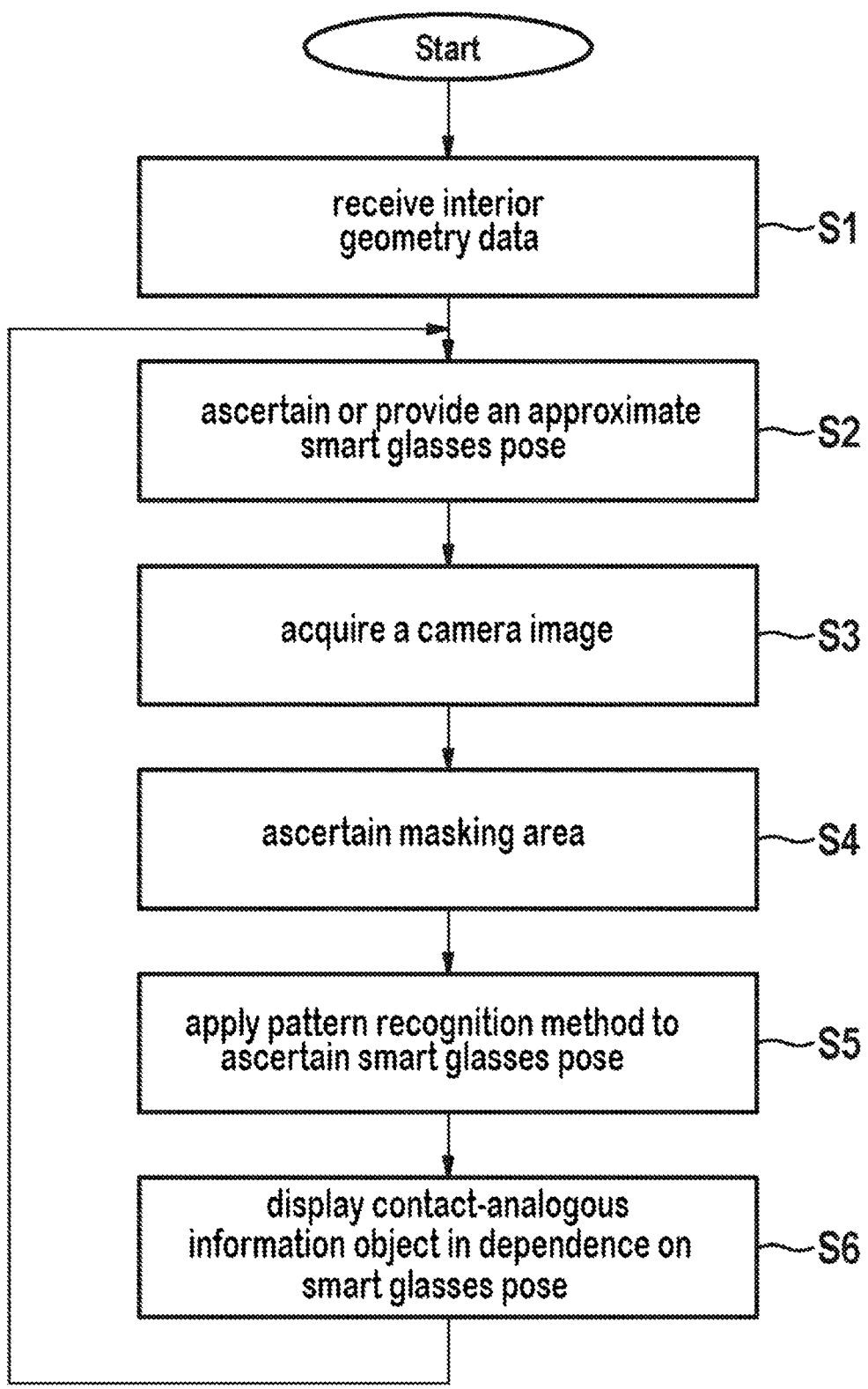
FIG. 2 shows a flow chart to illustrate a method for determining a smart glasses pose of smart glasses.

FIG. 2 shows a flow chart to illustrate a method for execution in the smart glasses 3 in order to ascertain a smart glasses pose based on the inside-out tracking.

In inside-out tracking, a camera image is acquired using the smart glasses camera 40, which at least partially corresponds to the field of view in the viewing direction of the wearer of the smart glasses 3. A determination of the pose of the smart glasses 3, i.e., a position and orientation of the smart glasses 3 in relation to a glasses-remote coordinate system is thus carried out. The determination of the smart glasses pose can take place relative to the vehicle, i.e., with respect to the vehicle coordinate system, or relative to the surroundings, i.e., with respect to the surroundings coordinate system (world-fixed coordinate system).

In step S1, after the coupling of the smart glasses 3 to the assistance system 2, initially the data for the relevant vehicle in which the wearer of the smart glasses 3 is located are selected or provided. The data describe the interior geometry of the vehicle and can correspond to CAD data or can be derived therefrom. These interior geometry data specify the structures in the interior of the vehicle and are matched to the type of the vehicle including special equipment of the relevant vehicle. Furthermore, the interior geometry data specify which of the objects and structures in the interior of the vehicle are arranged fixed in the vehicle and which are moving. Such structures and objects can be, for example, the gear selection switch, the steering wheel, or an interior mirror. Furthermore, the interior geometry data specify in which movement area the moving objects and structures can move.

In step S2, an approximate smart glasses pose is predetermined. The smart glasses pose can initially correspond to an approximate position of the smart glasses, for example predetermined by a wearer of the smart glasses 3 seated on a vehicle seat. Furthermore, a last determined smart glasses pose can also be used. In addition, the last determined smart glasses pose can be updated using items of movement information, for example ascertained using the inertial sensor, in order to obtain an approximate smart glasses pose.

In step S3, a camera image is acquired with the aid of the smart glasses camera 40. In the typical direction of view of the wearer of the smart glasses 3, the smart glasses camera 40 acquires the vehicle interior with objects and structures of the vehicle interior, such as the dashboard, the steering wheel, and the like and also windows and panes and surroundings objects located through the windows and panes in the surroundings of the vehicle. The typical evaluation of the camera image with the aid of a computer-based pattern recognition method can be interfered with by surroundings objects moving relative to the vehicle and can obstruct tracking of the smart glasses pose.

In step S4, a masking area in the field of view of the smart glasses 3 is ascertained based on the interior geometry data and the approximate smart glasses pose, which is predetermined by the vehicle contour of the vehicle interior. The vehicle contour of the vehicle interior is determined from the interior geometry data. Depending on the tracking goal, i.e., whether tracking is to take place on the vehicle coordinate system or the surroundings coordinate system, the masking area can mask transparent areas, such as panes and windows, and moving objects and structures of the vehicle interior in addition to their movement ranges or can mask all objects and structures of the vehicle interior. The masked areas are removed from the camera image or the recognition with the aid of the pattern recognition method is deactivated for the masked areas.

Figure 3A:
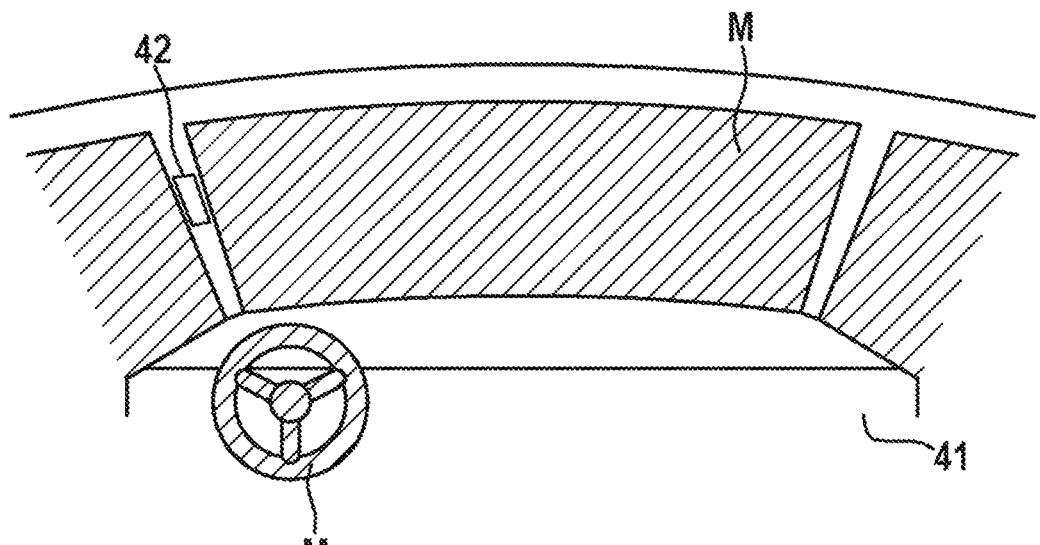
FIGS. 3a and 3b show representations of a camera image of a vehicle interior having correspondingly identified masking areas.
Figure 3B:
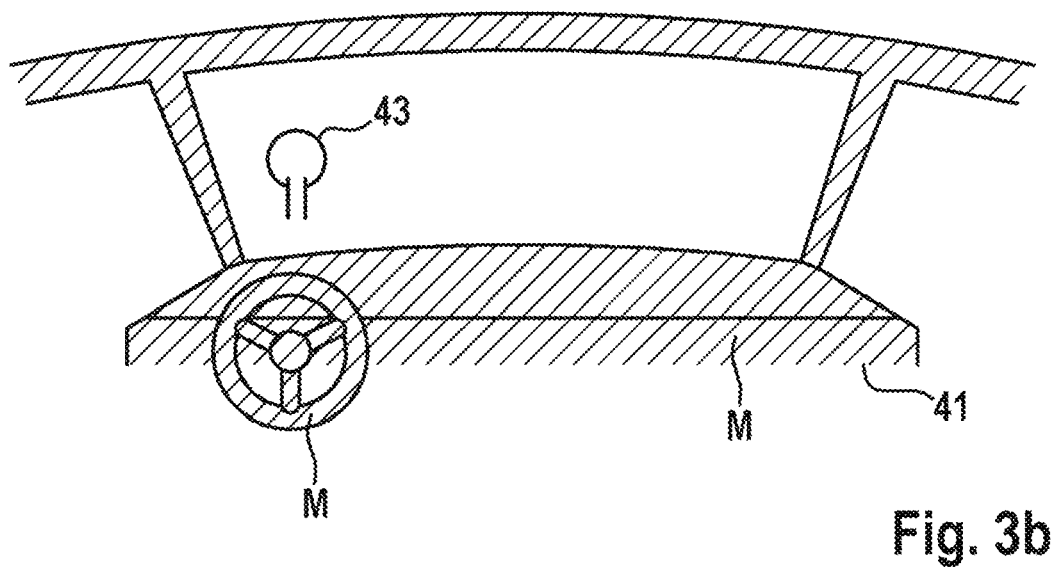

The field of view of a smart glasses camera 40 is shown by way of example in FIGS. 3a and 3b, wherein the respective masking areas M are identified by shading. FIG. 3a shows as shaded areas the transparent elements of the vehicle interior such as panes and windows as well as the moving objects and structures of the vehicle interior, such as the steering wheel and the gear selector switch. The remaining areas arranged fixed in the vehicle interior are not masked and are thus taken into consideration by the pattern recognition method. A marker 42 which lies on the A pillar is then outside the masking area M and can be used for the determination of the pose of the smart glasses 3.

In FIG. 3b, all elements of the vehicle interior are masked as masking areas and only the transparent areas, such as the windshield and the side windows, through which the vehicle surroundings can be perceived, are not masked. Therefore, inside-out tracking of the smart glasses 3 on surroundings objects can take place without the corresponding pattern recognition method taking into consideration structures and objects of the vehicle interior. A surroundings object 43 which is located in the vehicle surroundings then lies outside the masking area M and can be used for the determination of the pose of the smart glasses 3.

A masking area therefore results for the camera image of the field of view of the user in which only parts are taken into consideration for a subsequent evaluation.

In step S5, the camera image masked by the masking area is evaluated with the aid of computer-based pattern recognition methods known per se. These can recognize structures and edges of known objects or markers and the smart glasses pose can be concluded in a way known per se from their position, size, and/or alignment in relation to a glasses coordinate system. Depending on the application, the smart glasses pose is ascertained in relation to a vehicle coordinate system or a surroundings coordinate system in accordance with the selection of the masking areas M.

The smart glasses pose thus ascertained can be used in step S6 for the positioning and/or formation of the display of contact-analogous information objects on the display surface 35 of the smart glasses 3 in a way known per se.

Subsequently, the sequence jumps back to step S2 and the smart glasses pose thus ascertained is used as the foundation for the renewed ascertainment of a smart glasses pose for a subsequently acquired camera image.

LIST OF REFERENCE SIGNS 1 display system
2 assistance system
3 smart glasses
4 communication connection
21 communication unit
22 surroundings acquisition system
23 processor unit
31 frame
32 viewing panes
33 glasses earpiece
35 display surface
36 display device
37 control unit
38 glasses inertial sensor
39 communication device
40 smart glasses camera
41 vehicle interior
42 marker
43 surroundings object

The invention claimed is:

1. A method for operating smart glasses for augmented display of information objects on a display surface in dependence on a smart glasses pose in a vehicle interior of a vehicle, the method comprising:
ascertaining the smart glasses pose by inside-out tracking on at least one provided marker or at least one object, wherein:
the at least one marker or the at least one object is locatable by a computer-based pattern recognition method, which is applied to a camera image of a smart glasses camera, so that the smart glasses pose is determinable relative to a vehicle interior in dependence on at least one of a position, a size, or an alignment of the at least one marker or the at least one object, and
the camera image is only taken into consideration outside a masking area for the pattern recognition method.

2. The method according to claim 1, wherein the masking area comprises transparent areas and moving objects in the vehicle interior, so that the pattern recognition method only takes into consideration fixed areas in the vehicle interior.

3. The method according to claim 2, wherein the inside-out tracking ascertains the smart glasses pose in a vehicle coordinate system.

4. The method according to claim 1, wherein the masking area comprises all structures and objects in the vehicle interior, so that the pattern recognition method only takes into consideration areas outside the vehicle.

5. The method according to claim 4, wherein the inside-out tracking ascertains the smart glasses pose in a surroundings coordinate system.

6. The method according to claim 1, wherein the masking area is ascertained from interior geometry data.

7. The method according to claim 6, wherein the interior geometry data are derived from CAD data of the vehicle interior.

8. The method according to claim 6, wherein:
the interior geometry data are transmitted upon or immediately after start-up of the smart glasses in the vehicle from an assistance system of the vehicle to the smart glasses, and
the interior geometry data specify an interior geometry of the vehicle.

9. The method according to claim 1, wherein the masking area is applied to the camera image based on an initially predetermined smart glasses pose or a last ascertained smart glasses pose.

10. Smart glasses for augmented display of information objects, the smart glasses comprising:
a display surface, which is configured to display an information object in an augmented manner;

a smart glasses camera, which is configured to acquire a camera image having at least one marker or at least one object; and a control unit, which is configured:
- to mask the camera image using a masking area and to evaluate the masked camera image by using a computer-assisted pattern recognition method in order to locate the at least one marker or the at least one object;
- to ascertain a smart glasses pose by inside-out tracking in dependence on at least one of a position, a size, or an alignment in dependence on the at least one marker or the at least one object in the masked camera image, wherein the camera image is only taken into consideration outside the masking area for the pattern recognition method; and
- to output the information object on the display surface in dependence on the smart glasses pose.

\* \* \* \* \*